US012417272B1

(12) United States Patent
Kraus

(10) Patent No.: US 12,417,272 B1
(45) Date of Patent: Sep. 16, 2025

(54) MULTI-DIMENSIONAL USER VERIFICATION

(71) Applicant: Amazon Technologies, Inc., Seattle, WA (US)

(72) Inventor: Holger Kraus, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 204 days.

(21) Appl. No.: 17/850,862

(22) Filed: Jun. 27, 2022

(51) Int. Cl.
*G06F 21/33* (2013.01)

(52) U.S. Cl.
CPC ................................... *G06F 21/33* (2013.01)

(58) Field of Classification Search
CPC ...... G06F 21/31; G06F 3/04883; G06F 9/451; G06F 21/33
See application file for complete search history.

(56) References Cited

U.S. PATENT DOCUMENTS

| | | | | |
|---|---|---|---|---|
| 9,223,948 | B2* | 12/2015 | Griffin | G06F 21/31 |
| 10,846,385 | B1* | 11/2020 | Walters | G06F 21/40 |
| 10,958,784 | B1* | 3/2021 | Way | G06N 20/00 |
| 11,531,735 | B1* | 12/2022 | Patel | G06F 21/316 |
| 2018/0295128 | A1* | 10/2018 | Drake, II | H04L 63/0861 |
| 2018/0330694 | A1* | 11/2018 | Klein | G06F 9/44505 |
| 2018/0351925 | A1* | 12/2018 | Badri | H04L 63/105 |
| 2020/0388286 | A1* | 12/2020 | Park | G06V 10/764 |
| 2022/0383872 | A1* | 12/2022 | Li | G06F 40/205 |
| 2022/0392455 | A1* | 12/2022 | Ma | H04L 67/306 |

OTHER PUBLICATIONS

Lunerti et al., "Sensing Movement on Smartphone Devices to Assess User Interaction for Face Verification," 2018 International Carnahan Conference on Security Technology (ICCST) Year: 2018 | Conference Paper | Publisher: IEEE.*
Verma et al., "Biometric Based User Authentication in Smart Phones," 2017 International Conference on Next Generation Computing and Information Systems (ICNGCIS) Year: 2017 | Conference Paper | Publisher: IEEE.*

* cited by examiner

*Primary Examiner* — Roderick Tolentino
(74) *Attorney, Agent, or Firm* — Athorus, PLLC

(57) ABSTRACT

Described herein are systems and techniques for multi-dimensional user verification for an action request at a computing device. The user verification techniques include receiving a request for action at the device, determining, based on the type of request for action, a set of input factors to enable verification for the request to be performed. The status of the input factors may be determined or scored and used to evaluate a validity of the request and verification to perform the request. The techniques also describe carrying out the request or denying the request based on the validity of the input factors and evaluating manual validation techniques available to override the verification.

20 Claims, 8 Drawing Sheets

MULTI-DIMENSIONAL USER VERIFICATION

BACKGROUND

For some time, it has been common to provide mobile devices such as smartphones, tablet computers, laptop computers and the like with various mechanisms to provide lock-unlock functions. These functions help limit use of the device, to prevent unwanted persons from gaining access. In general, a mobile device will perform a lock function when a lock activation mode has been selected by an authorized user. In addition to activation at power on, a mobile device will typically also activate the lock function when there is no input from a user for a period of time.

Commonly known factors for controlling lock-unlock are the entry of passwords via a keyboard, finger swipe motions or drawing gestures on a touchscreen, sensors to detect fingerprints, facial recognition via built-in cameras, and others. It is also known to provide further security by combining two or more such factors before granting access to the device. Most typical systems for user verification are binary and do not provide flexibility and/or differentiation based on the types of actions the user is trying to take with the device. In such systems, the user is either verified or not and the system does not account for different types of users and/or actions performed using the device.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
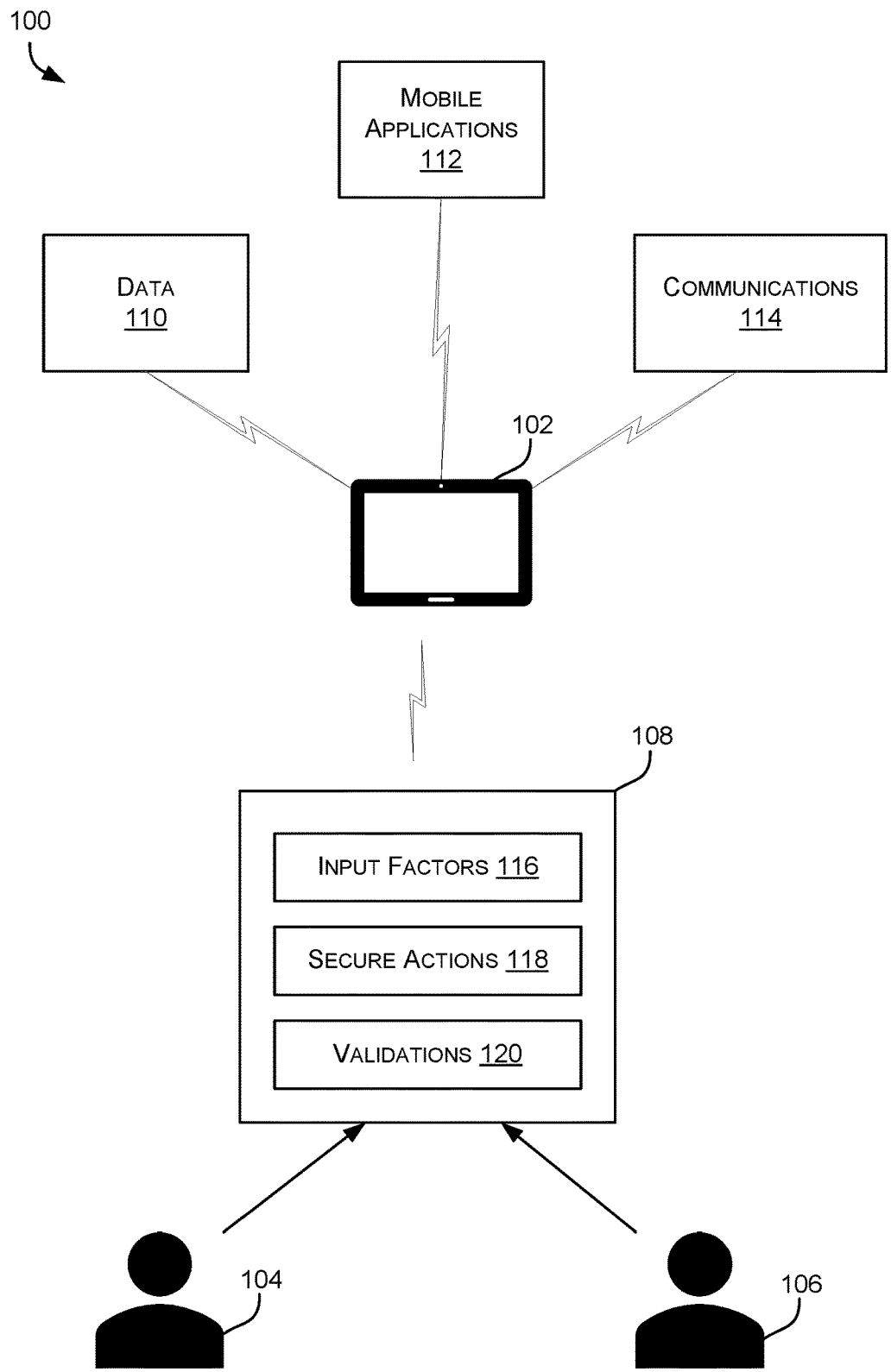
FIG. 1 illustrates an example system for one or more users to interact with a user device using multi-dimensional verification, according to at least one example.

The systems and methods described herein provide for multidimensional user verification that enables security for a user device in a more sophisticated manner than typical binary security systems. Typical binary security systems are either secured, e.g., locked, or are unlocked, and therefore present binary options for securing access to the user device and/or the information thereon. The systems and methods described herein provide for multi-dimensional user verification that enables varying degrees of security based on a number of different verification factors as well as based on the type of action or type of information to be accessed.

Multi-dimensional user verification uses a system that manages a set of input factors, a set of actions, and a set of validation mechanisms. The set of input factors includes inputs that may be used for user verification, such as device proximity to a peripheral device (e.g., a wearable device), time elapsed since last use, user identity (e.g., facial recognition), time of day, conditions for use (e.g., only enabling a particular application after a predetermined condition is met such as completing a task or checklist of items), etc. Other input factors may be established and may be customized such that the input factors can include any number and type of factors to condition access to a device, application, or data. Such input factors may be established by an administrator and may apply for all users of the user device. Though described herein with respect to user verification, the techniques described herein may be used for situational verification and/or verification of conditions that predicate any action carried out on and/or by a computing device.

The set of actions for the multi-dimensional user verification may include any action that the user may request that may be separately or individually secured. For example, the actions may include access to a user device, access to a single or set of applications hosted on the user device, and actions within the applications such as purchases or data access. In some examples, the actions may include nested actions, for example to require verification to launch an application and for subsequent actions within the application, requiring verification based on input factors specific to the particular action as well as input factors specific to launching the application. In this manner, the input factors may be used in a continuous or semi-continuous manner to enable actions and continue to allow actions to be performed only when input factors continue to be valid upon re-evaluation. This prevents the need for continuous manual validation by entering credentials while using the user device which may be cumbersome and intrusive, but also ensures security on the device and compliance with the established conditions for use of the user device.

One major problem of typical binary authentication techniques is that the user is verified only a single time, and with that single verification, the user is able to perform any and all actions with the user device until a verification is requested again. Such techniques lack a capability to have varying degrees of access and availability without constantly requiring a manual input of verification credentials. There are several possible security misuses of this typical verification technique that are resolved by the multi-dimensional user verification described herein. For example, if there is some break during the logout procedure, the system would typically stay in an unlocked state and an attacker might have access using the current verified procedure and user profile. Additionally, varying levels of access, and/or personalized controls over conditions to provide access to a device, program, or data, ensure that user verification takes into account more than a manual verification, but also considers additional factors before enabling access. Finally, the systems and methods described herein may provide the user with an ability to access secured devices, applications, and data, without manually entering credentials by instead analyzing various input factors to determine whether access should be granted upon a request.

In an illustrative example, a user device may include a mobile computing device such as a tablet or other such computing device and be owned by a first user who is a first type of user (e.g., an administrator, owner, parent, etc.) and may be accessed by a second user who is a second type of user (e.g., guest, child, etc.). The first user may establish conditions for different actions to be taken with respect to the user device. For instance, in an example of a parent and child, the parent may establish multi-dimensional user verification to launch certain mobile applications such as games on the user device and may establish input factors that require the child to have completed one or more particular tasks (e.g., completed an allotted amount of time reading in a reading application) before the game is unlocked for launching. Additional input factors may include identification that the device has been used in a previous thirty seconds and that the second user is the child user. Upon verification of the input factors, the child may be able to launch the game without entering any credentials. Until the conditions of the input factors are met, the child may be unable to launch the game because the input factors are not valid. In some examples, upon the request to launch the game, in the event that one or more of the input factors are invalid, the user device may prompt for manual validation, such as a password or other verification instrument to be entered to override the input factors. In some examples, one or more of the input factors may include a prohibition on launching the game until the reading is complete and may therefore not provide a prompt for the manual validation until the prohibition condition is removed.

In a second illustrative example, the user device may include a computing device that may be provided to guest users, for example at a public location or shared location. An owner of the user device may wish to restrict access to different actions on the user device for different users. Accordingly, the owner may establish different input factors for various actions with the user device. In an example, the user device may be in a locked state until input factors including proximity to a peripheral device (such as a user's mobile device that may be registered with the owner of the shared location) and a location of the user device (e.g., within the shared location such as within a coffee shop). Until those input factors are valid, the user device may be in a locked state and prevent the user from interacting. Upon validation of the input factors for unlocking the user device, additional input factors may be established for launching an application hosted by the user device. The additional input factors for a particular application, such as an internet accessible application, may include the proximity of the mobile device and classification of the user as an adult instead of a child. In some examples, the user may launch the application through a manual validation using one or more validation mechanisms such as an account password, PIN, or other such manual validation to override the input factors.

In some examples, the input factors may include factors that may be evaluated on a scale, e.g., with a score, rather than a binary evaluation of valid or invalid. In such examples, the input factors may be evaluated with a score and access for the user device, data, or application may be granted based on an aggregated score of the input factors exceeding a threshold. For instance, a set of input factors may be used for launching a particular mobile application on the user device. The set of input factors may include factors such as an elapsed time since last use of the device and a distance to a peripheral device (such as a wearable device or mobile device). The input factors may be evaluated with a score for each, for example with a device having been used within a previous fifteen seconds receiving a score of 100 while use within a previous five minutes receives a score of thirty and use within a previous ten minutes receives a score of 10. The distance to the peripheral may likewise be evaluated, with a distance less than one meter receiving a score of 100 and at a distance of three meters receiving a score of twenty. In such an example, if the user device had a threshold score for activation of 30, the user may perform an action if the user device has been used recently (e.g., within the last five minutes) due to the input factor score reaching the threshold of 30. In another example where the user device has been inactive for ten minutes, the score of 10 based on the most recent use is insufficient to reach the threshold. However, if the peripheral device is within three meters, then the combined input factor score reaches the threshold and enables the user device to perform the action. Though examples have been provided above of particular factors and scores, additional factors and varying scores may be provided according to particular implementations outside of those discussed above.

Turning now to the figures, FIG. 1, illustrates a system 100 for one or more users to interact with a user device using multi-dimensional verification, according to at least one example. The system 100 includes a user device 102, such as a tablet or mobile device that a first user 104 and/or a second user 106 may interact with. The first user 104 and/or the second user 106 may interact with the user device 102 to access data 110, launch and interact with mobile applications 112, and/or communicate 114 with other devices. The first user 104 and the second user 106 may be different users that have different levels of permission on the user device 102, or in other words, may be of a first type and a second type of user. In some instances, the first user 104 may be an owner, parent, and/or logged-in user while the second user 106 is a guest, child, employee, or non-logged-in user. In some user devices, the first user 104 and the second user 106 may use the same verification credentials that provide binary access to all of the abilities and data on the user device 102. The multi-dimensional user verification according to the present description enables granular security and access to data and applications as well as for the user device 102 without the cumbersome need to constantly enter user credentials.

Multi-dimensional user verification 108 uses a system that manages a set of input factors 116, a set of actions 118, and a set of validation mechanisms 120. The set of input factors 116 includes inputs that may be used for user verification, such as device proximity to a peripheral device (e.g., a wearable device), time elapsed since last use, user identity (e.g., facial recognition), time of day, conditions for use (e.g., only enabling a particular application after a predetermined condition is met such as completing a task or checklist of items), etc. Other input factors may be established and may be customized such that the input factors can include any number and type of factors to condition access to a device, application, or data. Input factors 116 may be established by an administrator, such as the first user 104 having first credentials and may apply for all users of the user device who have credentials other than administrator credentials, such as the second user 106. In some examples, the set of input factors 116 may vary for the first user 104 and the second user 106, such that additional verification factors are implemented or required when the second user 106 is in control of the user device 102.

The set of actions 118 for the multi-dimensional user verification 108 may include any action that the user may request that may be separately or individually secured. For example, the actions may include access to the user device 102, e.g., to unlock the user device 102, access to a single or set of applications hosted on the user device 102, and actions within the applications such as purchases or data access. In some examples, the actions may include nested actions, for example to require verification to launch an application and for subsequent actions within the application, requiring verification based on input factors specific to the particular action as well as input factors specific to launching the application. In this manner, the input factors 116 may be used in a continuous or semi-continuous manner to enable the set of actions 118 and continue to allow actions to be performed only when input factors 116 continue to be valid upon re-evaluation. This prevents the need for continuous manual validation by entering credentials while using the user device which may be cumbersome and intrusive, but also ensures security on the device and compliance with the established conditions for use of the user device.

In some examples, the users may launch the application through a manual validation using one or more validation mechanisms 120 such as an account password, PIN, or other such manual validation to override the input factors. The validation mechanisms 120 may define which validations mechanisms 120 can be used to override the input factors 116 as well as to define when the input factors 116 may prohibit use of validation mechanisms 120 to override the input factors 116, such as when a prohibitive input factor is activated.

In some examples, the input factors 116 may include factors that may be evaluated on a scale, e.g., with a score, rather than a binary evaluation of valid or invalid. In such examples, the input factors 116 may be evaluated with a score and access for the user device 102, data, or application may be granted based on an aggregated score of the input factors exceeding a threshold. For instance, a set of input factors 116 may be used for launching a particular mobile application on the user device 102. The set of input factors 116 may include factors such as an elapsed time since last use of the user device 102 and a distance to a peripheral device (such as a wearable device or mobile device). The input factors 116 may be evaluated with a score for each, for example with a device having been used within a previous fifteen seconds receiving a score of 100 while use within a previous five minutes receives a score of thirty and use within a previous ten minutes receives a score of 10. The distance to the peripheral may likewise be evaluated, with a distance less than one meter receiving a score of 100 and at a distance of three meters receiving a score of twenty. In such an example, if the user device had a threshold score for activation of 30, the user may perform an action if the user device has been used recently (e.g., within the last five minutes) due to the input factor score reaching the threshold of 30. In another example where the user device has been inactive for ten minutes, the score of 10 based on the most recent use is insufficient to reach the threshold. However, if the peripheral device is within three meters, then the combined input factor score reaches the threshold and enables the user device to perform the action. Though examples have been provided above of particular factors and scores, additional factors and varying scores may be provided according to particular implementations outside of those discussed herein.

Figure 2:
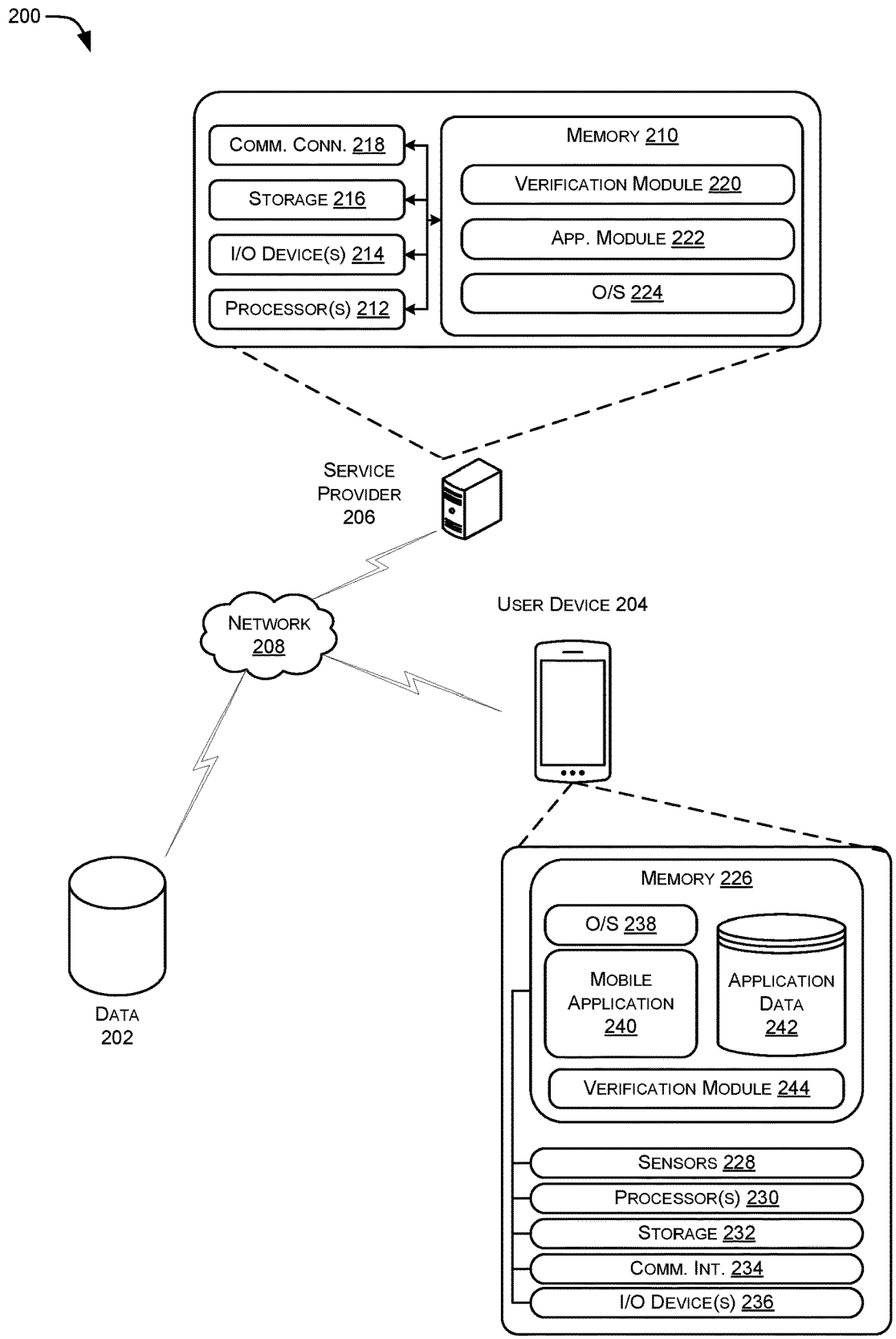
FIG. 2 illustrates an example system architecture for implementing multi-dimensional user verification, according to at least one example.

FIG. 2 illustrates a system architecture 200 for implementing multi-dimensional user verification, according to at least one example. In the system architecture 200, a user device 204 may be used by one or more users to interact with other elements of the system, with interactions at the user device 204 verified through a multi-dimensional user verification. The multi-dimensional user verification may be performed at the user device 204 and/or at the service provider 206 in some examples. The multi-dimensional user verification may be performed in response to a request by a user for one or more of the elements in the system architecture 200 to perform an action. The user device 204 may be an example of the user device 102. The user device 204 may be used by one or more users to interact with the service provider 206. Additional elements, such as wearable devices, additional user devices, and other such elements may also be included as part of the system architecture and may be in communication with one or more of the elements of the system architecture.

In FIG. 2, the elements of the system architecture 200 are shown in communication over network 208. The network 208 may be a communication network that enables the various elements of the system architecture 200 to communicate. In some examples, the network 208 may include one or more different networks or communication pathways. The communication network may include any one or a combination of many different types of networks, such as cable networks, the Internet, wireless networks, cellular networks, and other private and/or public networks. In addition, the communication network may comprise multiple different networks. For example, the user device 204 may utilize a wireless local area network (WLAN) to communicate with a wireless router, which may then route the communication over a public network (e.g., the Internet) to the service provider 206.

The data 202 may include data in one or more forms that may be stored remotely from the user device 204 and/or the service provider 206. The data 202 may include data that may be encrypted and/or secured as well as unsecured data. The multi-dimensional user verification may enable access to the secured and/or encrypted data in a secure manner and also enable access to the unsecured data. The secured data may be accessed individually and/or as collections or groups, thereby eliminating risk from a binary unlock for all of the data 202 in response to a single verification.

The service provider 206 includes one or more components and may include one or more computing devices. The service provider 206 includes a memory 210, one or more processor(s) 212, input/output devices 214, additional storage 216, and communication connections 218. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

The memory 210 may store program instructions that are loadable and executable on the processor(s) 212, as well as data generated during the execution of these programs. The memory 210 may be volatile (such as random access memory (RAM)) and/or non-volatile (such as read-only memory (ROM), flash memory, etc.). The service provider 206 may also include additional storage 216, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM. Turning to the contents of the memory 210 in more detail, the memory 210 may include a verification module 220, an application module 222, and an operating system 224.

The verification module 220 may perform verifications in response to requests received from the user device 204. The verification module 220 may perform a multi-dimensional user verification that analyzes one or more input factors based on the type of request initiated by the user, and determines a validity for the input factors. In the event of a validity determination, the verification module 220 may pass the request to the application module 222 to perform the request. In the event of an invalidity determination, the verification module 220 may stop the request and/or may request manual validation from the user via the user device 204 and/or the input/output device 214 before proceeding with the request.

The application module 222 may provide or host one or more mobile applications for users to interact with via the user device 204. The mobile application may be used to perform one or more actions and display the same on the user device 204.

The user device 204 may be any suitable electronic device that is capable of providing at least a portion of the capabilities described herein. In particular, the user device 204 may be any electronic device capable of communicating with the service provider 206, and the other elements of the system architecture 200. In an embodiment, the user device 204 may be capable of establishing a communication session with another electronic device and transmitting/receiving data from that electronic device. The user device 204 may include the ability to download and/or execute mobile applications. User device 204 may include mobile communication devices as well as personal computers and thin-client devices. In some embodiments, a user device 204 may include any portable electronic device that has a primary function related to communication. For example, the user device 204 may be a smart phone, a tablet, a personal data assistant (PDA), or any other suitable handheld device. The user device 204 can be implemented as a self-contained unit with various components (e.g., input sensors, one or more processors, memory, etc.) integrated into the user device 204.

In an embodiment, the user device 204 may include a memory 226 and one or more processing units (or processor(s) 230). The processor(s) 230 may be implemented as appropriate in hardware, computer-executable instructions, firmware or combinations thereof. Computer-executable instruction or firmware implementations of the processor(s) 230 may include computer-executable or machine executable instructions written in any suitable programming language to perform the various functions described. The user device 204 may also include one or more input sensors 228 for receiving user and/or environmental input. There may be a variety of input sensors 228 capable of detecting user or environmental input, such as an accelerometer, a camera device, a depth sensor, a microphone, a global positioning system (e.g., GPS) receiver, etc.

The memory 226 may store program instructions that are loadable and executable on the processor(s) 230, as well as data generated during the execution of these programs. Depending on the configuration and type of user device 204, the memory 226 may be volatile (such as random access memory (RAM)) and/or non-volatile (such as read-only memory (ROM), flash memory, etc.). The user device 204 may also include additional storage 232, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 226 may include multiple different types of memory, such as static random access memory (SRAM), dynamic random access memory (DRAM) or ROM.

Turning to the contents of the memory 226 in more detail, the memory 226 may include an operating system 238 and one or more application programs or services for implementing the features disclosed herein including at least a mobile application 240. The memory 226 may also include a verification module 244. The verification module 244 may perform verifications in response to requests received at the user device 204. The verification module 244 may perform a multi-dimensional user verification that analyzes one or more input factors based on the type of request initiated by the user, and determines a validity for the input factors. In the event of a validity determination, the verification module 244 may pass the request to the mobile application 240 and/or the service provider 206 to perform the request. In the event of an invalidity determination, the verification module 244 may stop the request and/or may request manual validation from the user via the user device 204 at the input/output device(s) 236 before proceeding with the request.

The memory 226 may also include application data 242, which provides information to be generated by and/or consumed by the mobile application 240. In some embodiments, the application data 242 may be stored in a database.

For the purposes of this disclosure, a mobile application may be any set of computer executable instructions installed upon, and executed from, a user device 204. In some embodiments, the mobile application 240 may cause a user device 204 to establish a communication session with the service provider 206 that provides backend support for the mobile application 240. In some embodiments, a user may be required to log into the mobile application 240 via the verification module 244 through a multi-dimensional user verification in order to access functionality provided by the mobile application 240.

The user device 204 may also contain communications interfaces 234 that enable the user device 204 to communicate with any other suitable electronic devices. In some embodiments, the communication interface 234 may enable the user device 204 to communicate with other electronic devices on a network 208 (e.g., on a private network). For example, the user device 204 may include a Bluetooth wireless communication module, which allows it to communicate with another electronic device. The user device 204 may also include input/output (I/O) device(s) 236, such as for enabling connection with a keyboard, a mouse, a pen, a voice input device, a touch input device, a display, speakers, a printer, etc.

The block diagrams of FIGS. 3-6 illustrate examples of multi-dimensional user verification schemes that may be established for different secure actions. The multi-dimensional user verifications are not all-encompassing, but are intended as illustrative to show different arrangements and options. Additional input factors, actions, and validation mechanisms may be added and/or removed from the examples. Additional arrangements, conditions, and possibilities are contemplated and will be apparent after discussing the examples shown in FIGS. 3-6. Furthermore, though a particular structure and arrangement is illustrated, the examples of FIGS. 3-6 are illustrative and not intended to limit the structure of one or more verification modules that may employ the multi-dimensional user verification described herein.

Figure 3:
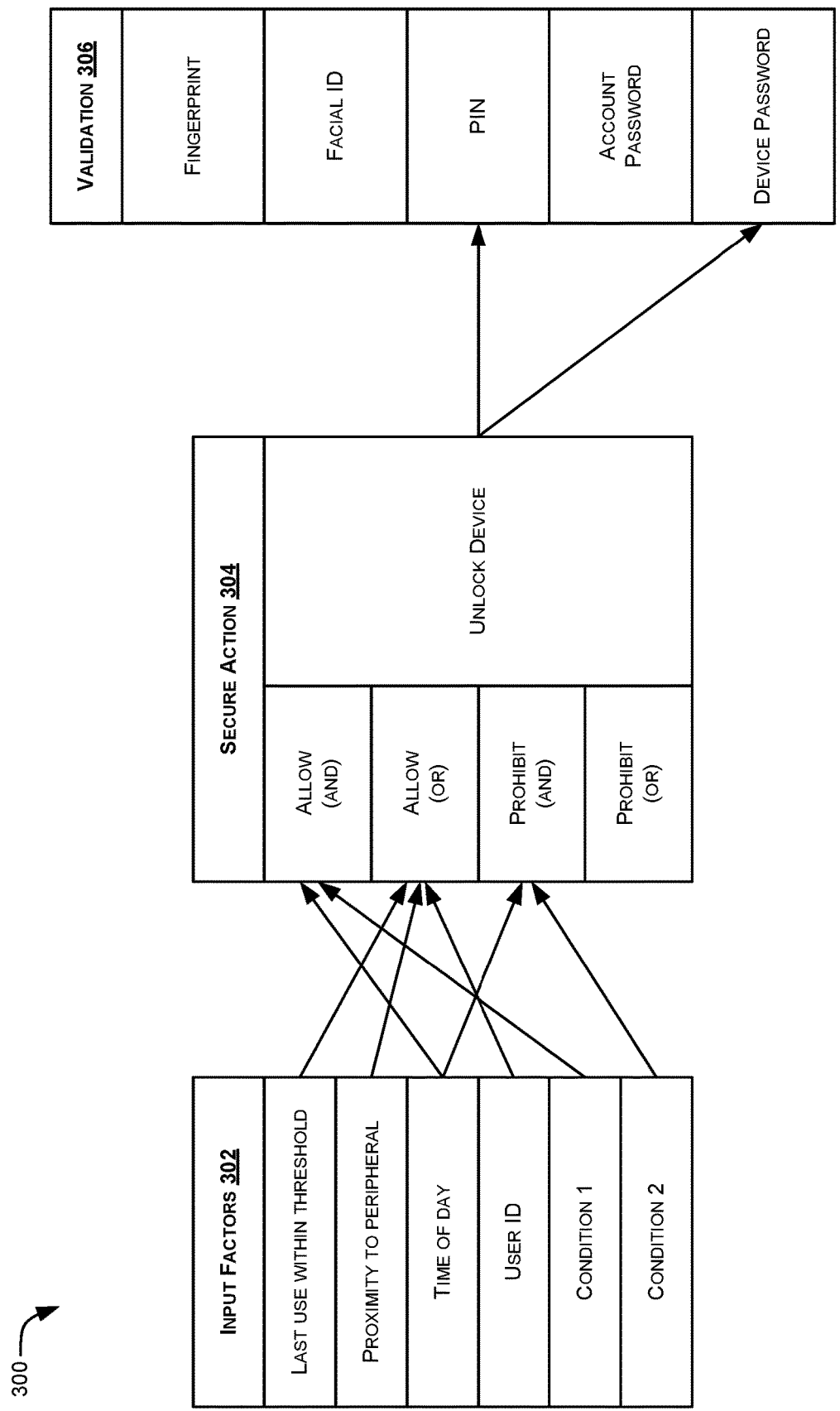
FIG. 3 illustrates an example block diagram of a multi-dimensional user verification for accessing a user device, according to at least one example.

FIG. 3 illustrates an example block diagram of a multi-dimensional user verification 300 for accessing a user device, according to at least one example. The multi-dimensional user verification 300 is illustrated as a series of blocks for input factors 302 that may be used to perform the action 304, unlocking the user device 102 in the case of FIG. 3. Additional manual validation 306 are also illustrated as defined in the particular example.

The input factors 302 are defined as potential factors that may be used for multi-dimensional user verification. During a setup phase, or as part of a standardized approach, input factors 302 are assigned to the action 304 to enable the action 304 when validated. For example, as shown in FIG. 3, the input factors 302 may include determining whether a last use of the user device 102 is within a threshold period of time, whether a peripheral device (e.g., a smart watch or other device) is within a threshold distance, a particular time of day, a user identification (e.g., from facial recognition of an image and/or video captured by the user device 102), and customized conditions, for example to dictate customized conditions. The customized conditions may include conditions established by the first user 104 for the second user 106 to fulfill, such as performing a task or action verifiable by the user device 102. The input factors 302 are assigned to the action 304 and may be assigned as permissive or prohibitive factors. The permissive factors may be input factors 302 that are used to enable the action while prohibitive factors may be used to prohibit or prevent the action 304. The input factors 302 may be evaluated individually (OR conditions) or as a collective (AND conditions).

During evaluation of the input factors 302, the input factors may, in some examples, include binary determinations that must all be valid for the action 304 to be performed. In some examples, the input factors 302 may be evaluated in a binary manner with a certain threshold number of input factors 302 required to be valid for the action 304 to be carried out. In some examples, the input factors 302 may be ranked and/or given a preference with more preferred input factors capable of causing the action 304 to be performed, while input factors 302 having lower preference scores requiring additional input factors 302 to perform a verification.

In some examples, the input factors 302 may be evaluated based on a scoring metric for each of the input factors 302 and/or as a collective input factor score. The input factors 302 may be evaluated on a numeric scale and access for the user device 102 may be granted based on an aggregated score of the input factors 302 exceeding a threshold. For instance, the input factors 302 may include factors such as an elapsed time since last use of the user device 102 and a distance to a peripheral device (such as a wearable device or mobile device). The input factors 302 may be evaluated with a score for each, for example with a device having been used within a previous fifteen seconds receiving a score of 100 while use within a previous five minutes receives a score of thirty and use within a previous ten minutes receives a score of 10. The distance to the peripheral may likewise be evaluated, with a distance less than one meter receiving a score of 100 and at a distance of three meters receiving a score of twenty. In such an example, if the user device had a threshold score for activation of 30, the user may perform an action if the user device has been used recently (e.g., within the last five minutes) due to the input factor score reaching the threshold of 30. In another example where the user device has been inactive for ten minutes, the score of 10 based on the most recent use is insufficient to reach the threshold. However, if the peripheral device is within three meters, then the combined input factor score reaches the threshold and enables the user device to perform the action.

In some examples, the prohibitive factors may also be scored and the score may be subtracted from the aggregate score of the permissive input factors. In such an example, the permissive input factors may result in a score that would enable unlocking the user device 102 but the presence of one or more prohibitive scores may be subtracted from the aggregate and prevent unlocking of the user device.

In the particular example shown in FIG. 3, unlocking the user device is established as predicated on input factors 302 in several different combinations. For example, the action 304 may be performed if a time of day matches a specified factor time of day (e.g., evening) and the first condition is also valid. The action 304 may also be performed as a result of any of: the last use being within a threshold period of time, a peripheral device (such as a smart watch) being within a threshold distance, or a user identification through use of a camera of the user device 102. In some examples, the user device 102 may be prevented from unlocking as a result of a combination of a certain time of day (e.g., morning) and a second condition, such as a conflicting appointment on a user calendar or predicated action for the user to perform before unlocking the user device 102.

The action 304 is secured according to the input factors 302 and may be unlocked when the input factors 302 are fulfilled, as described above, either according to validation or a scoring threshold. Either of a first user 104 or the second user 106 may unlock the user device 102 according to the input factors 302. In some examples, different users may have different input factors 302 for the same action 304. For instance, an administrator account may have more input factors 302 when the administrator account is associated with the user device (e.g., recently logged in) so as to secure the potentially more sensitive information accessible through an administrator account. In some examples, the administrator account may have fewer input factors 302 as the user is a more trusted user. In some examples, various different input factors may be implemented at the user device based on a risk score or trust level associated with a particular user. The risk score may be evaluated based on a number of factors, such as the sensitivity of information accessible by the user, the length of established account, and other such factors. In some examples, the risk and/or trust may be determined using a risk model that may implement one or more machine learning approaches trained to assign risk scores to users based on various factors.

In any event, in some examples, the input factors 302 may prevent the action 304 from being performed. In such examples, the user may wish to pursue the action 304 and ask to manually validate in order to unlock the user device 102. In such examples, the manual validation 306 may be used according to defined credentials. The defined credentials of the manual validation 306 define which credentials may be used to override the input factors 302 and unlock the device. In some examples, in the event of a prohibitive factor being active, the manual validation 306 may be unavailable until the prohibitive factor is resolved. As illustrated in FIG.

3, the manual validation 306 may be performed using a device password or PIN, but other validation mechanisms may be unavailable for unlocking the device.

Figure 4:
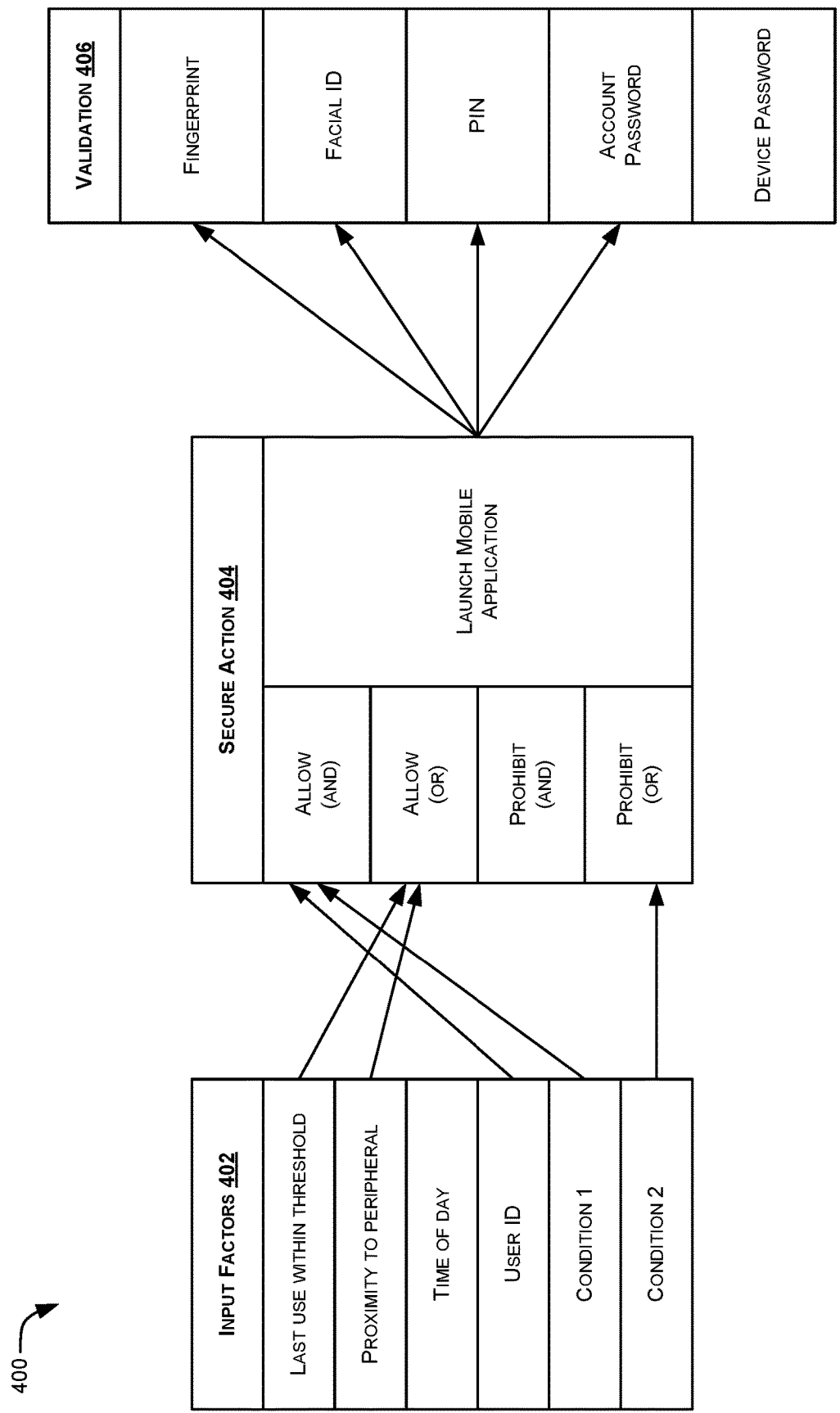
FIG. 4 illustrates an example block diagram of a multi-dimensional user verification for launching a mobile application, according to at least one example.

FIG. 4 illustrates an example block diagram of a multi-dimensional user verification 400 for launching a mobile application, according to at least one example. The multi-dimensional user verification 400 is illustrated as a series of blocks for input factors 402 that may be used to perform the action 404, launching a mobile application on the user device 102 in the case of FIG. 4. Additional manual validation 406 are also illustrated as defined in the particular example. The multi-dimensional user verification 400 may be similar to the multi-dimensional user verification of FIG. 3 described above and include input factors 402, action 404, and manual validation 406 that may be similar and/or identical to the input factors 302, action 304, and manual validation 306 of FIG. 3. In FIG. 4, the action 404 requested at the user device 102 is to launch a particular mobile application.

As with FIG. 3, the action 404 may be performed when the input factors 402 are validated as described above. The validation may be performed according to any of the techniques described herein and be based on binary determinations, score thresholds, score aggregation, or other evaluations of the input factors 402.

The input factors 402 for launching the mobile application in the multi-dimensional user verification 400 include identifying the user through one or more sensors and/or systems associated with the user device and validating the first condition, such as to verify performance of a particular task. The mobile application may additionally be launched based on either a recent use of the application and/or user device 102 within a threshold period of time or as a result of detecting a peripheral device within the proximity of the user device 102. The second condition is established as a prohibitive factor that precludes launching the mobile application when valid. For instance, in a case of a child user of a user device, the second condition may prohibit launching of particular applications during school hours during the week.

Further, the manual validation 406 for overriding launching of the application includes additional validation mechanisms that may be specific to the first user 104, the user device 102, or the second user 106. For example, an account password may be an account password for the first user, while the PIN may be specific to the user device 102. In some examples, the account password may be specific to the second user 106 and enable the second user to override the input factors 402 for launching the mobile application.

Figure 5:
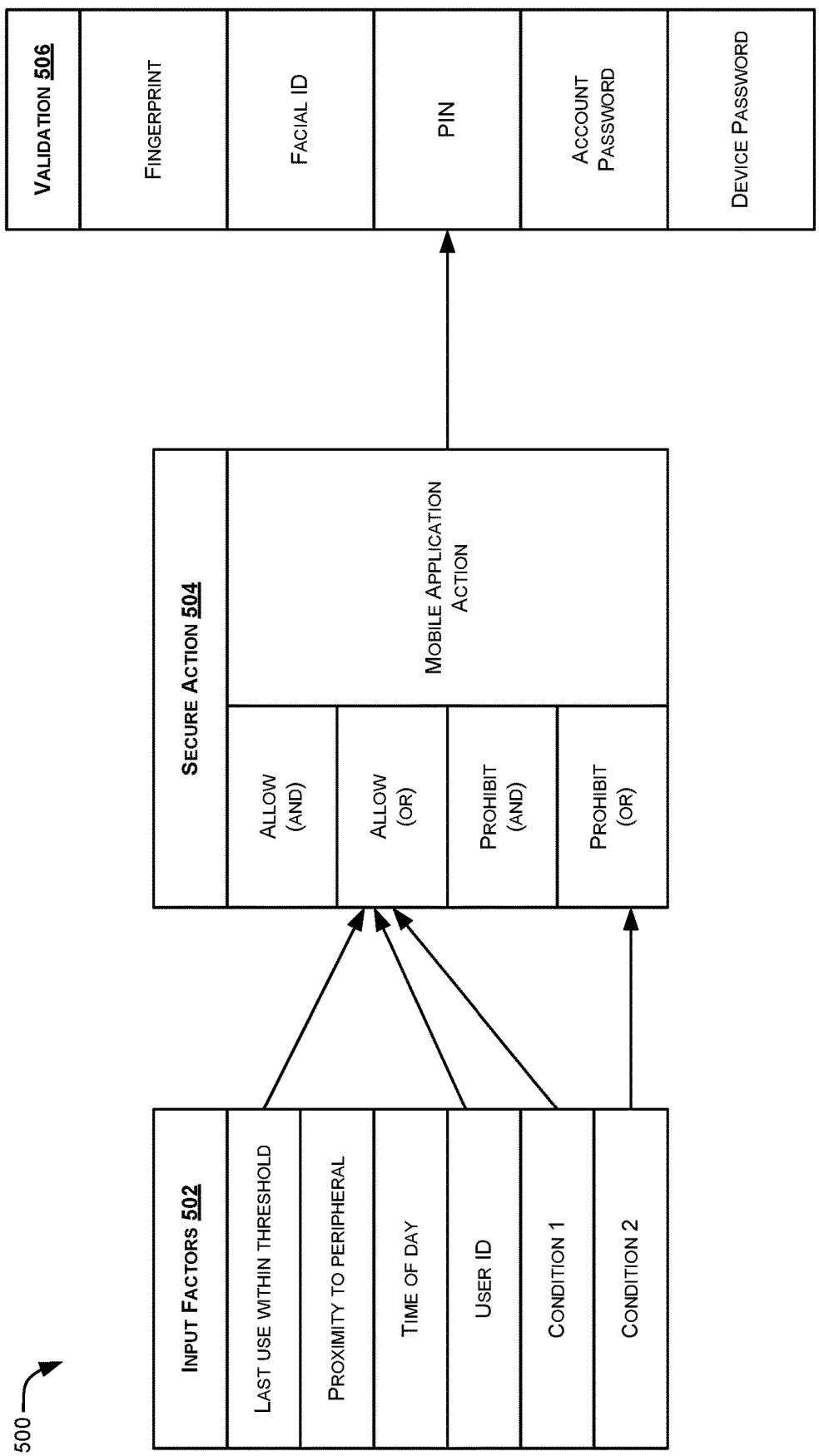
FIG. 5 illustrates an example block diagram of a multi-dimensional user verification for performing an action within a mobile application, according to at least one example.

FIG. 5 illustrates an example block diagram of a multi-dimensional user verification 500 for performing an action within a mobile application, according to at least one example. The multi-dimensional user verification 500 is illustrated as a series of blocks for input factors 502 that may be used to perform the action 504, performing an action within a mobile application in the case of FIG. 5. Additional manual validation 506 are also illustrated as defined in the particular example. The multi-dimensional user verification 500 may be similar to the multi-dimensional user verification of FIG. 3 described above and include input factors 502, action 504, and manual validation 506 that may be similar and/or identical to the input factors 302, action 304, and manual validation 306 of FIG. 3. In FIG. 5, the action 504 requested at the user device 102 is to perform an action within a particular mobile application.

As with FIG. 3, the action 504 may be performed when the input factors 502 are validated as described above. The validation may be performed according to any of the techniques described herein and be based on binary determinations, score thresholds, score aggregation, or other evaluations of the input factors 502.

The input factors 502 for launching the mobile application in the multi-dimensional user verification 500 include any of: a use within a time threshold, a user identification, or satisfaction of the first condition. In some examples, the user identification may be based on facial recognition using image data captured by the user device. The user identification may, in some examples, be distinct from a facial recognition credential and may not meet or require as stringent of a facial recognition match as a credential may in some examples. Any of the input factors 502 may be used to perform the action within the mobile application. The second condition is established as a prohibitive factor that precludes performing the action within the mobile application when valid.

Further, the manual validation 506 for overriding launching of the application includes only use of the PIN, though in some examples, other validations such as with the account password, may be used for overriding the input factors.

Figure 6:
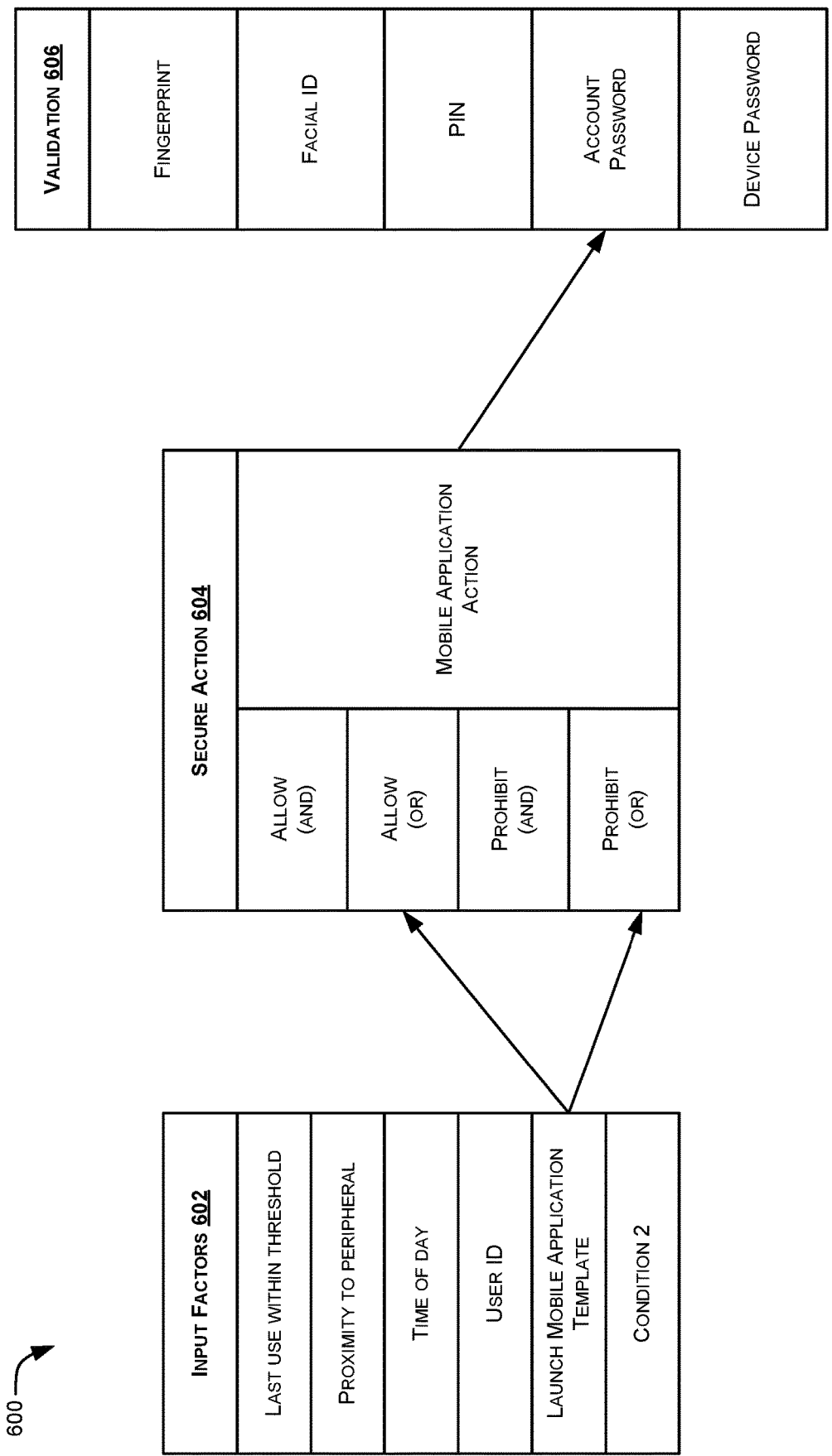
FIG. 6 illustrates an example block diagram of a multi-dimensional user verification for nesting user verifications within a mobile application to rely on previous verification inputs, according to at least one example.

FIG. 6 illustrates an example block diagram of a multi-dimensional user verification 600 for nesting user verifications within a mobile application to rely on previous verification inputs, according to at least one example. The multi-dimensional user verification 600 is illustrated as a series of blocks for input factors 602 that may be used to perform the action 604, performing an action within a mobile application on the user device 102 in the case of FIG. 5, where the input factors 602 rely on input factors 502 used for launching the mobile application. Additional validation mechanisms 606 are also illustrated as defined in the particular example.

In the multi-dimensional user verification 600, the first condition is established as using some or all of the conditions established for launching the mobile application. In this manner, a template may be established that can be used to generate additional input factors. Accordingly, in the multi-dimensional user verification 600, the action within the mobile application may be permitted or prohibited according to the specifics of the input factors used to launch that particular mobile application. In some examples, additional input factors may be added, for example to require additional input factors before making a purchase through a mobile application than required to launch the application. In this manner, the multi-dimensional user verification 600 may be nested and/or dependent on other verifications that may be adjusted to change across multiple different verification processes.

Figure 7:
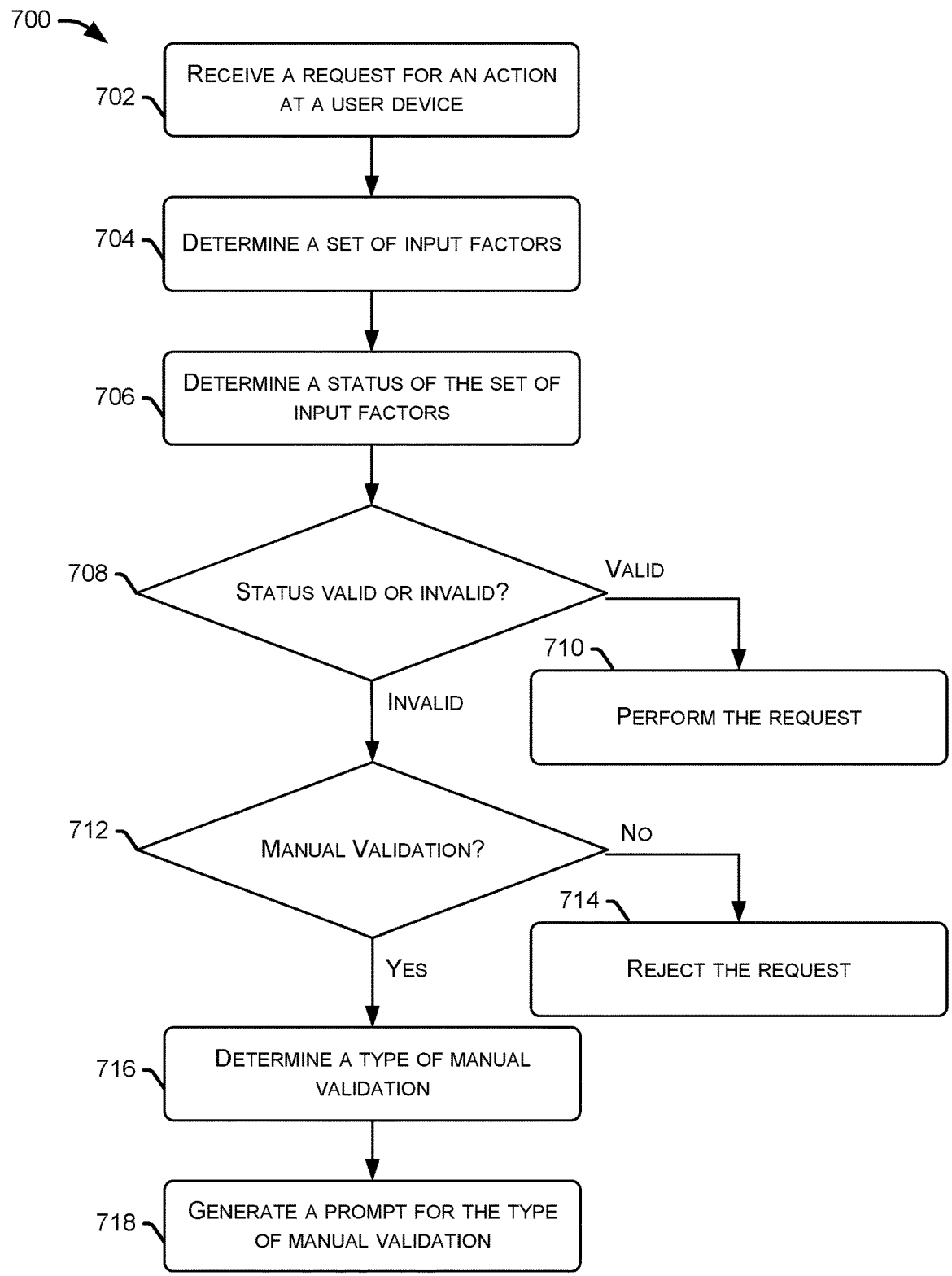
FIG. 7 illustrates a process for multi-dimensional user verification, according to at least one example.

FIG. 7 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 7 illustrates a process 700 for multi-dimensional user verification, according to at least one example. The process 700 may be performed on any suitable computing device, for example including a mobile device, smartphone, tablet, personal computer, laptop, or other computing device capable of receiving requests for action and carrying out said requests.

At 702, the process 700 includes receiving a request for an action at a user device. The request may be received from a user through a user input device and/or over a network and received from a separate network-connected computing device. The request may include one or more actions for the computing device to carry out. The one or more actions may include one or more secured actions that require verification before carrying out, for example to protect data, personal information, privacy, or other such information.

At 704, the process includes determining a set of input factors. The set of input factors may be determined based on the type of action requested. For example a first set of input factors may be defined for a first type of action, such as unlocking the computing device. A second set of input factors different from the first set of input factors may be used for a second type of action, such as to access particular secured data on the computing device. Determining the input factors may include accessing a verification module where input factor information may be stored. The input factors may be defined by one or more users of the computing device, or may be established as standardized by a programmer of the computing device and/or security protocol associated with the computing device.

At 706, the process 700 includes determining a status of the set of input factors. The status of the set of input factors may include determining a validity or invalidity of each of the set of input factors. In some examples, the status of the input factors may include a score associated with each of the input factors, as described herein. The input factors may be scored and/or validated individually and/or as a collection before determining overall validity for the set of input factors.

At 708, the process 700 includes determining whether the status of the set of input factors is valid or invalid. Determining the status for the set of input factors may include evaluating the binary decisions and identifying any prohibitive factors that preclude action and/or identifying if all required input factors are valid. In some examples, as described herein, the status may be determined based on the aggregate score of the scores for the input factors. For instance, the scores of the input factors may be summed together and compared against a threshold score. Prohibitive factors may be subtracted from the aggregate score in some examples. In some examples, the scores may be aggregated by averaging, or combining subsets of the sets of input factors based on predetermined relationships, e.g., whether the input factors are defined as AND or OR factors.

In the event the status is valid, the process 700 proceeds to 710 where the request is carried out by the computing device.

In the event the status is invalid, the process 700 proceeds to 712 where the computing device, via the verification module, evaluates whether manual validation is permitted for the request. In some examples, a prohibitive input factor may preclude use of manual validation to override the input factors. In some examples, the manual validation may be prohibited to secure data and/or other information on the user device.

In the event that no manual validation is enabled, the process 700 proceeds to 714 where the request is rejected. In some examples, the computing device may generate a notification to the user that the manual validation is not available and/or that the requested action is unavailable. In some examples, the request may simply not be performed without any notification to the user. In some examples, the notification may include an indication of what input factors preclude performance of the request and/or preclude use of manual validation to override the input factors.

In the event that manual validation is available, the process 700 proceeds to 716 where the computing device may determine a type of manual validation available. The type of manual validation available may be predetermined for the user device. In some examples, the type of manual validation available may be based on the type of request, such as whether the request is to unlock a device or launch a particular application.

After determining one or more types of manual validation available, the computing device may generate a prompt for the user to input one or more of the types of manual validation. In some examples, multiple types of validation credentials may be required. In some examples, the prompt may ask for a particular type of validation credential. In some examples, the prompt may allow a user to select a type of available validation credential to enter to override the input factors.

Figure 8:
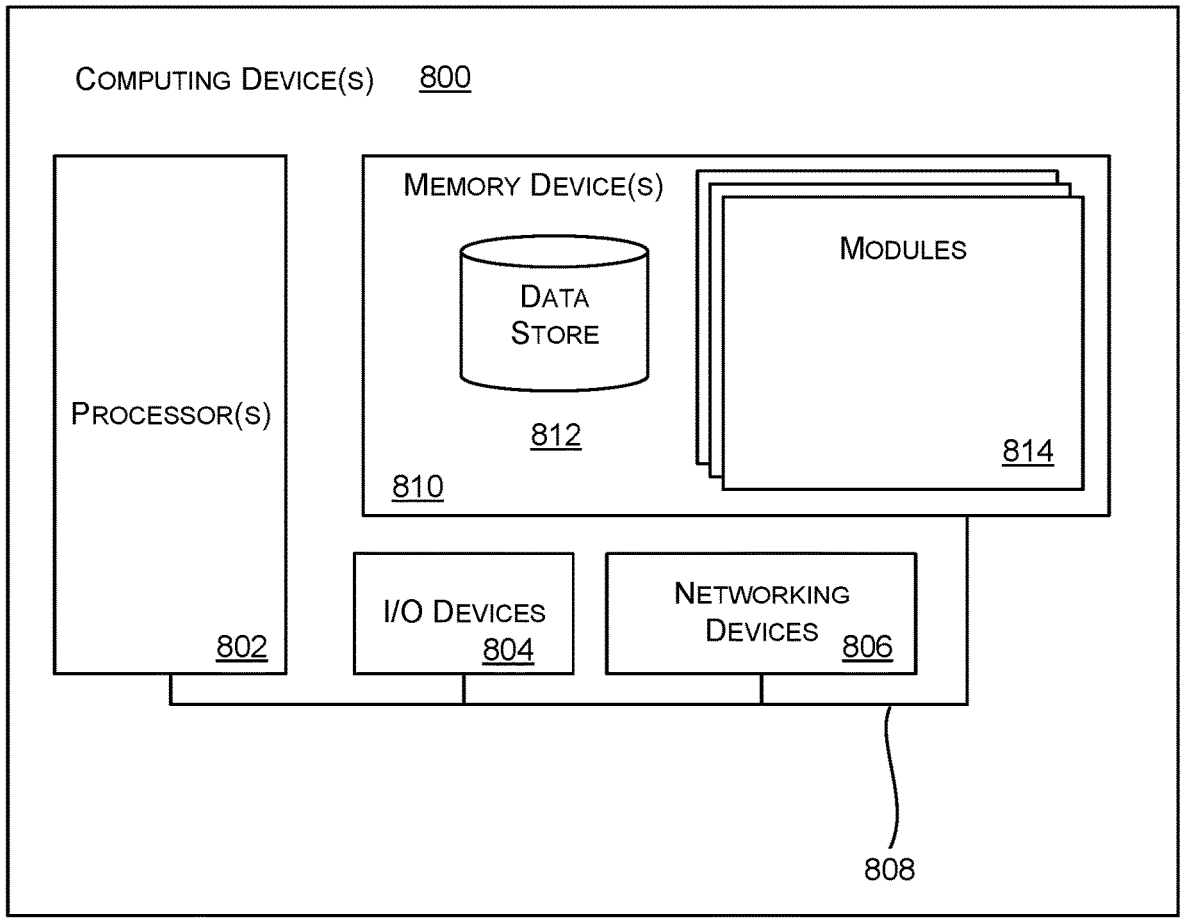
FIG. 8 illustrates a block diagram of a computing system for use with the systems and methods described herein, according to at least one example.

FIG. 8 illustrates a block diagram of a computing device 800 for use in multi-dimensional user verification, according to the present description. The computing device 800 may include one or more computing devices on which services or modules of this technology may execute. The computing device 800 is illustrated on which a high-level example of the technology may be executed. The computing device 800 may include one or more processors 802 that are in communication with memory devices 810. The computing device 800 may include a local communication interface 808 for the components in the computing device. For example, the local communication interface 808 may be a local data bus and/or any related address or control busses as may be desired.

The memory device 810 may contain modules 814 that are executable by the processor(s) and data for the modules 814. A data store 812 may also be located in the memory device 810 for storing data related to the modules and other applications along with an operating system that is executable by the processor 802.

The computing device 800 may further include or be in communication with a client device, which may include a display device. The client device may be available for an administrator to use in interfacing with the computing device 800, such as to review operation of a virtual computing instance, make improvements to machine learning models and so forth.

Various applications may be stored in the memory device 810 and may be executable by the processor 802. Components or modules discussed in this description that may be implemented in the form of software using high programming level languages that are compiled, interpreted or executed using a hybrid of the methods.

The computing device 800 may also have access to I/O (input/output) devices 804 that are usable by the computing devices. An example of an I/O device 804 is a display screen that is available to display output from the computing devices. Other known I/O devices may be used with the computing device as desired. Networking devices 806 and similar communication devices may be included in the computing device 800. The networking devices 806 may be wired or wireless networking devices 806 that connect to the internet, a LAN, WAN, or other computing network.

The components or modules that are shown as being stored in the memory device 810 may be executed by the processor 802. The term "executable" may mean a program file that is in a form that may be executed by a processor 802. For example, a program in a higher-level language may be compiled into machine code in a format that may be loaded into a random access portion of the memory device 810 and executed by the processor 802, or source code may be loaded by another executable program and interpreted to generate instructions in a random access portion of the memory to be executed by a processor 802. The executable program may be stored in any portion or component of the memory device 810. For example, the memory device 810 may be random access memory (RAM), read only memory (ROM), flash memory, a solid-state drive, memory card, a hard drive, optical disk, floppy disk, magnetic tape, or any other memory components.

The processor 802 may represent multiple processors and the memory device 810 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A user device, comprising:
   a user input device;
   one or more processors; and
   one or more computer-readable media storing instructions that, when executed by the one or more processors, cause the one or more processors to perform operations comprising:
      receiving, via the user input device, a first request to unlock the user device;
      determining, based on the first request to unlock the user device, a first set of input factors including two or more input factors associated with the first request, the two or more input factors including a first input factor of an elapsed time since a last unlock of the user device and a second input factor of an approximate distance between the user device and a peripheral device detectable by the user device;
      determining a status of the first set of input factors, wherein determining the status of the first set of input factors comprises:
         determining one or more scores for each input factor of the first set of input factors;
         determining an aggregated score of the one or more scores;
         comparing the aggregated score to a predetermined threshold; and
         determining the status of the first set of input factors is valid in response to the aggregated score exceeding the predetermined threshold;
      causing, in response to the status of the first set of input factors being valid, the user device to unlock;
      causing, in response to the status of the first set of input factors being invalid, the user device to generate a prompt for a first manual validation before unlocking;
      receiving, via the user input device, a second request to launch a mobile application on the user device;
      determining a second set of input factors based on the second request, the second set of input factors different from the first set of input factors;
      determining a status of the second set of input factors;
      causing, in response to the status of the second set of input factors being valid, the user device to launch the mobile application; and
      causing, in response to the status of the second set of input factors being invalid, the user device to generate a prompt for a second manual validation before launching the mobile application.

2. The user device of claim 1, wherein causing the user device to generate the prompt for the first manual validation or the second manual validation comprises:
   determining a type of manual validation based on a request type of the first request or the second request; and
   generating the prompt based on the type of manual validation.

3. The user device of claim 1, wherein at least one of the two or more input factors includes a condition set by a first user to control access to the user device.

4. A method, comprising:
   receiving, at a user device, a first request for a first type of action at the user device;
   determining, based on the first type of action, a first set of input factors including two or more input factors associated with the first request, the two or more input factors including a first input factor of an elapsed time since a last unlock of the user device and a second input factor of an approximate distance between the user device and a peripheral device detectable by the user device;
   determining a status of the first set of input factors, wherein determining the status of the first set of input factors comprises:
      determining one or more scores for each input factor of the first set of input factors;
      determining an aggregated score of the one or more scores;
      comparing the aggregated score to a predetermined threshold; and
      determining the status of the first set of input factors is valid in response to the aggregated score exceeding the predetermined threshold;

causing, in response to the status of the first set of input factors being valid, the user device to perform the first request; and causing, in response to the status of the first set of input factors being invalid, the user device to generate a prompt for a manual validation.

5. The method of claim 4, wherein the first set of input factors being invalid comprises determining one or more of the first set of input factors is unfulfilled.

6. The method of claim 4, wherein the first set of input factors being invalid comprises determining a prohibition factor of the first set of input factors is fulfilled.

7. The method of claim 4, wherein causing the user device to generate a prompt for the manual validation comprises:
  determining a type of manual validation based on a request type of the first request; and
  generating the prompt based on the type of manual validation.

8. The method of claim 4, further comprising:
  receiving, at the user device, a second request for a second type of action at the user device, the second type action different from the first type of action;
  determining a second set of input factors based on the second request, the second set of input factors different from the first set of input factors;
  determining a status of the second set of input factors;
  causing, in response to the status of the second set of input factors being valid, the user device to perform the second request; and
  causing, in response to the status of the second set of input factors being invalid, the user device to generate a prompt for a manual validation before performing the second request.

9. The method of claim 8, wherein:
  the first request is to launch a mobile application on the user device;
  the second request is to perform an action within the mobile application; and
  the second set of input factors comprises the first set of input factors.

10. The method of claim 4, wherein the first request comprises at least one of:
  a request to unlock the user device;
  a request to launch a mobile application on the user device; or
  a request to perform an action within the mobile application.

11. The method of claim 4, wherein the first set of input factors comprises:
  one or more allowance factors that, when validated, enable activation of the first request; and
  one or more prohibition factors that, when validated, prohibit activation of the first request.

12. The method of claim 4, wherein at least one of the two or more input factors includes a condition set by a first user to control access to the user device.

13. The method of claim 12, the wherein at least one of the two or more input factors includes a condition set by a first user to control access to the user device.

14. One or more non-transitory computer-readable media storing instructions that, when executed by one or more processors, cause the one or more processors to perform operations comprising:
  receiving, at a user device, a first request for a first type of action at the user device;
  determining, based on the first type of action, a first set of input factors including two or more input factors associated with the first request, the two or more input factors including a first input factor of an elapsed time since a last unlock of the user device and a second input factor of an approximate distance between the user device and a peripheral device detectable by the user device;
  determining a status of the first set of input factors, wherein determining the status of the first set of input factors comprises:
    determining one or more scores for each input factor of the first set of input factors;
    determining an aggregated score of the one or more scores;
    comparing the aggregated score to a predetermined threshold; and
    determining the status of the first set of input factors is valid in response to the aggregated score exceeding the predetermined threshold;
  causing, in response to the status of the first set of input factors being valid, the user device to perform the first request; and
  causing, in response to the status of the first set of input factors being invalid, the user device to generate a prompt for a manual validation.

15. The one or more non-transitory computer-readable media of claim 14, wherein causing the user device to generate a prompt for the manual validation comprises:
  determining a type of manual validation based on a request type of the first request; and
  generating the prompt based on the type of manual validation.

16. The one or more non-transitory computer-readable media of claim 14, wherein the first set of input factors comprises:
  one or more allowance factors that, when validated, enable activation of the first request; and
  one or more prohibition factors that, when validated, prohibit activation of the first request.

17. The one or more non-transitory computer-readable media of claim 14, wherein the instructions comprise further instructions that, when executed by the one or more processors, cause the one or more processors to perform additional actions comprising:
  receiving, at the user device, a second request for a second action at the user device, the second action different from the first action;
  determining a second set of input factors based on the second request, the second set of input factors different from the first set of input factors;
  determining a status of the second set of input factors;
  causing, in response to the status of the second set of input factors being valid, the user device to perform the second request; and
  causing, in response to the status of the second set of input factors being invalid, the user device to generate a prompt for a manual validation before performing the second request.

18. The one or more non-transitory computer-readable media of claim 17, wherein:
  the first request is to launch a mobile application on the user device;
  the second request is to perform an action within the mobile application; and
  the second set of input factors comprises the first set of input factors.

19. The one or more non-transitory computer-readable media of claim 14, wherein the first set of input factors being invalid comprises determining one or more of the first set of input factors is unfulfilled.

20. The one or more non-transitory computer-readable media of claim 14, wherein the first set of input factors being invalid comprises determining a prohibition factor of the first set of input factors is fulfilled.

* * * * *